US012786340B2

(12) United States Patent
Chen et al.

(10) Patent No.: US 12,786,340 B2
(45) Date of Patent: Nov. 3, 2026

(54) SCANNER GENERATING IMAGE FILE INCLUDING TRANSPARENCY AND VISIBLE LIGHT INFORMATION

(71) Applicant: AVISION INC., Hsinchu (TW)

(72) Inventors: Yen-Cheng Chen, Hsinchu County (TW); Chun-Chieh Liao, Hsinchu City (TW)

(73) Assignee: AVISION INC., Hsinchu (TW)

( * ) Notice: Subject to any disclaimer, the term of this patent is extended or adjusted under 35 U.S.C. 154(b) by 212 days.

(21) Appl. No.: 18/795,884

(22) Filed: Aug. 6, 2024

(65) Prior Publication Data

US 2025/0106342 A1 Mar. 27, 2025

(30) Foreign Application Priority Data

Sep. 22, 2023 (TW) ................................ 112136160

(51) Int. Cl.
*H04N 1/387* (2006.01)

(52) U.S. Cl.
CPC ......... *H04N 1/3878* (2013.01); *H04N 1/3872* (2013.01)

(58) Field of Classification Search
CPC ...... H04N 1/3878; H04N 1/3872; H04N 1/38; H04N 1/409; H04N 1/00328; H04N 1/00185; H04N 1/00742; H04N 1/04
See application file for complete search history.

(56) References Cited

U.S. PATENT DOCUMENTS

2004/0207889 A1* 10/2004 Tu .......................... H04N 1/409 358/509
2007/0285739 A1 12/2007 Nakano et al.
(Continued)

FOREIGN PATENT DOCUMENTS

| | | | |
|---|---|---|---|
| CN | 100542205 | C | 9/2009 |
| CN | 102238306 | B | 10/2014 |
| CN | 112135006 | B | 11/2022 |
| CN | 115308170 | A | 11/2022 |
| TW | 202101393 | A | 1/2021 |

(Continued)

OTHER PUBLICATIONS

Chimei Museum Oil Painting Restorer Li Wenyuan, "Infrared reflection image", https://peekingbehind.chimeimuseum.org/Theme/Nondestructive/2011250545692, Retrieval date May 7, 2024, with 15 pages of screenshots.

*Primary Examiner* — Ming Y Hon
(74) *Attorney, Agent, or Firm* — MUNCY, GEISSLER, OLDS & LOWE, P.C.

(57) ABSTRACT

A scanner generating an image file including transparency and visible light information includes: a scanning module scanning a document to generate a first signal and a second signal, wherein the first signal is representative of a composite visible light image of the document and a background element, and the second signal is representative of a transmitting light image transmitting through the document; a processor, which is electrically connected to the scanning module, and generates a final image file having first pixels and second pixels according to the first signal and the second signal, wherein the first pixels and the second pixels are arranged in a rectangular array, the first pixels are representative of a visible light image of the document, the second pixels are representative of a remaining image other than the document, and the second pixels have transmitting light channel values greater than 0%; and an output port being electrically connected to the processor and outputting the final image file to an external device.

9 Claims, 5 Drawing Sheets

(56) References Cited

U.S. PATENT DOCUMENTS

| | | | | |
|---|---|---|---|---|
| 2008/0111894 | A1* | 5/2008 | Tanimoto | H04N 23/843 348/222.1 |
| 2011/0261425 | A1 | 10/2011 | Yamaguchi | |
| 2015/0381909 | A1* | 12/2015 | Butte | A61B 1/00188 250/578.1 |
| 2019/0180415 | A1* | 6/2019 | Lee | G06V 10/44 |
| 2020/0126510 | A1 | 4/2020 | Shiokawa et al. | |
| 2020/0143551 | A1* | 5/2020 | Gonzalez Aguirre | G06T 7/174 |
| 2020/0374469 | A1* | 11/2020 | Numata | H04N 23/88 |
| 2020/0412916 | A1 | 12/2020 | Kobayashi et al. | |
| 2021/0211616 | A1* | 7/2021 | Wang | H04N 25/131 |
| 2022/0124204 | A1* | 4/2022 | Chen | H04N 1/00005 |
| 2022/0124219 | A1 | 4/2022 | Chen | |
| 2022/0345579 | A1 | 10/2022 | Ono et al. | |
| 2023/0049248 | A1* | 2/2023 | Liu | H04N 5/265 |
| 2024/0015374 | A1* | 1/2024 | Kitahashi | G06T 5/50 |
| 2024/0037710 | A1* | 2/2024 | Shimada | G06V 10/24 |
| 2024/0164850 | A1* | 5/2024 | Ramirez Luna | A61B 3/14 |
| 2026/0093116 | A1* | 4/2026 | Deng | G02B 27/0172 |

FOREIGN PATENT DOCUMENTS

| | | | |
|---|---|---|---|
| TW | I749814 | B | 12/2021 |
| TW | 202226215 | A | 7/2022 |

* cited by examiner

SCANNER GENERATING IMAGE FILE INCLUDING TRANSPARENCY AND VISIBLE LIGHT INFORMATION

CROSS-REFERENCE TO RELATED APPLICATIONS

This application claims priority of No. 112136160 filed in Taiwan R.O.C. on Sep. 22, 2023 under 35 USC 119, the entire content of which is hereby incorporated by reference.

FIELD OF THE INVENTION

This disclosure relates to a scanner, and more particularly to a scanner generating an image file including transparency (or transmitting light) information and visible light information.

DESCRIPTION OF RELATED ART

After a conventional scanner has scanned a document having a hole, the obtained visible light image has a totally black hole image at a position corresponding to the hole. If a user wants to print out the visible light image, a lot of toner is wasted in printing the totally black hole image. At present, copiers on the market directly print out the totally black hole image. Although the hole image can be removed using image processing software, such post-processing is not accurate, occupies a lot of performance, wastes the user's time, and is a hindrance to users unfamiliar with computers.

On the other hand, a preview scan can be performed to set boundaries to be cropped and prevent the hole or damaged portion from being formally scanned. However, if the information around the hole is not scanned, the scan is not complete, and such the operation method is also very complicated. In addition, due to the restriction of the optical principle, shadows will be present at locations corresponding to edges of the document upon document scanning, and complicated post-processing is needed to precisely remove the shadows, or the shadows cannot be easily removed. The easy way is to process the image by way of frame cropping. However, the shadows sometimes cannot be correctly removed.

As the development of computer software advances day by day, the user can drag one image across different backgrounds to render the blending effects of the different backgrounds with the image. Therefore, how to correctly determine the contour of the original for the further application is indeed a problem to be solved by this disclosure.

SUMMARY OF THE INVENTION

It is therefore an objective of this disclosure to provide a scanner generating an image file, which includes transparency and visible light information, and can be immediately outputted to an external device for applications.

To achieve the above-identified objective, this disclosure provides a scanner including: a scanning module scanning a document to generate a first signal and a second signal, wherein the first signal is representative of a composite visible light image of the document and a background element, and the second signal is representative of a transmitting light image transmitting through the document; a processor, which is electrically connected to the scanning module, and generates a final image file having first pixels and second pixels according to the first signal and the second signal, wherein the first pixels and the second pixels are arranged in a rectangular array, the first pixels are representative of a visible light image of the document, the second pixels are representative of a remaining image other than the document, and the second pixels have transmitting light channel values greater than 0%; and an output port being electrically connected to the processor and outputting the final image file to an external device.

With the above-mentioned embodiment, the scanner can be used to directly obtain and generate the image file including the transparency and visible light information, and the generated file may have a portable network graphics (PNG) format or other file formats. After the external device has received the file, a non-physical part corresponding to the document and a part other than the document may change to the color of the background with the change of the color of the background, and an original contour of the document can be present. On the other hand, the shadow of the document may also be further removed, so that the original contour of the document can be present without distortion.

In order to make the above-mentioned content of this disclosure more obvious and be easily understood, preferred embodiments will be described in detail as follows in conjunction with the accompanying drawings.

DETAILED DESCRIPTION OF THE INVENTION

Figure 1:
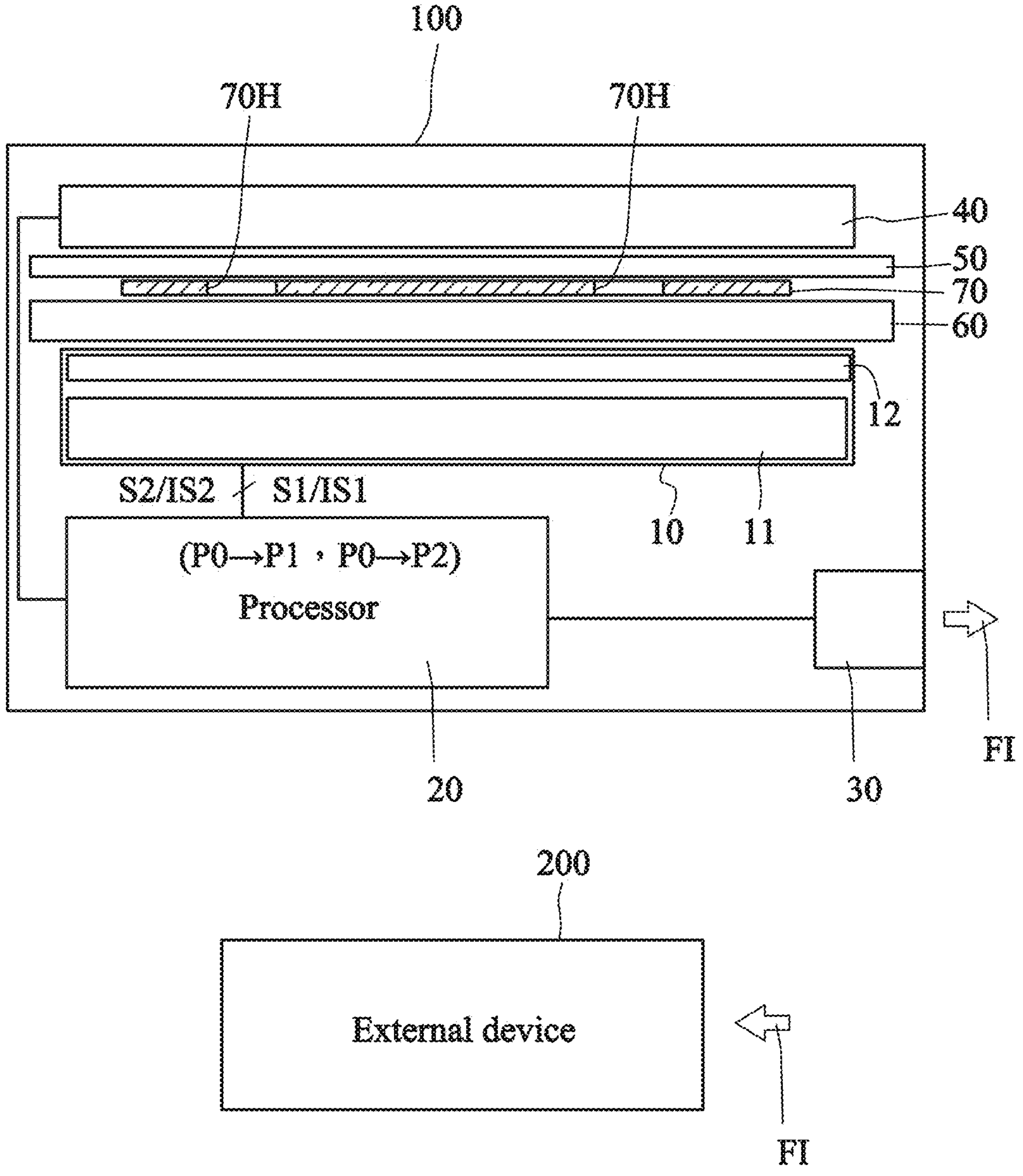
FIG. 1 is a schematic view showing a scanner according to a preferred embodiment of this disclosure.
Figure 2:
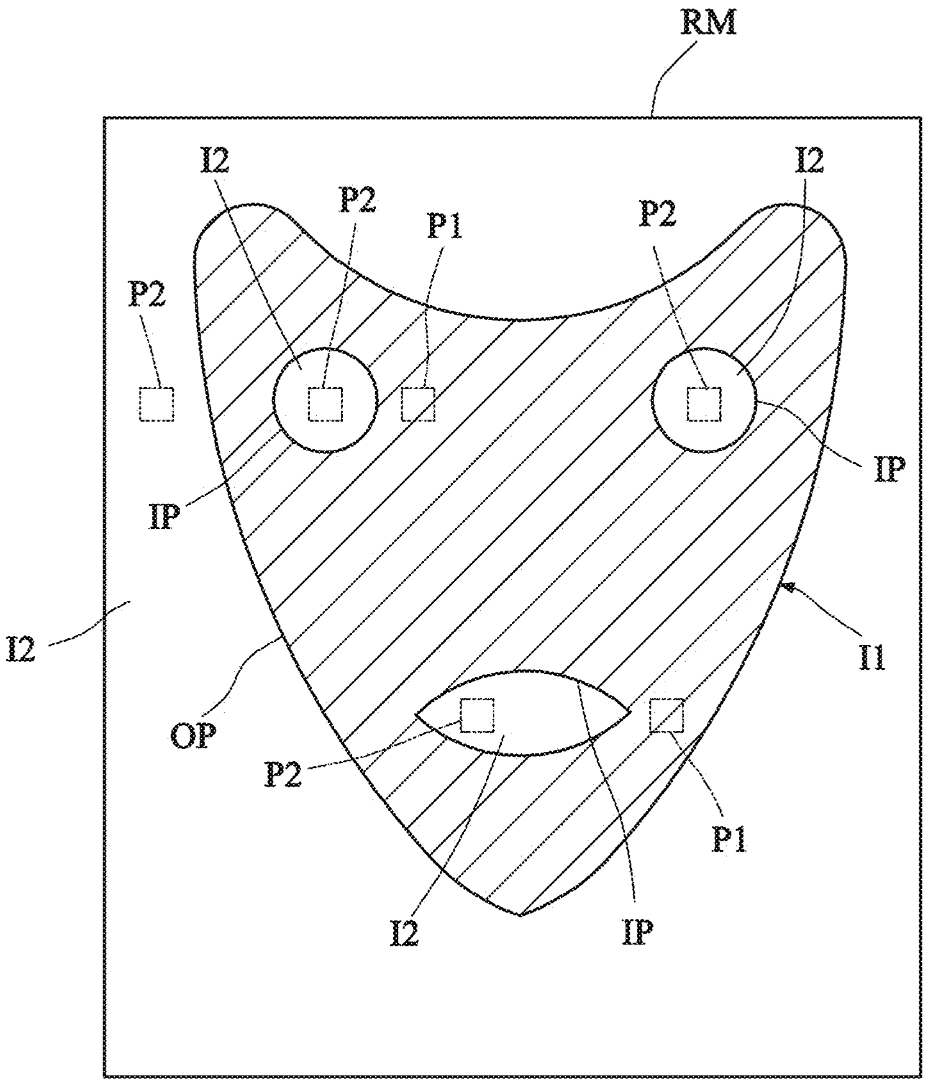
FIG. 2 is a schematic view showing a visible light image and a remaining image outputted from the scanner of FIG. 1.

FIG. 1 is a schematic view showing a scanner 100 according to a preferred embodiment of this disclosure. FIG. 2 is a schematic view showing a visible light image and a remaining image outputted from the scanner 100 of FIG. 1. Referring to FIGS. 1 and 2, the scanner 100 includes a scanning module 10, a processor 20 and an output port 30. The scanner 100 may be a document scanner or a multi-function peripheral.

The scanning module 10 scans a document 70 and a background element 50 to generate a first signal S1 and a second signal S2. In one example, a visible light source 12 of the scanning module 10 is disposed below a transparent platen 60, and outputs visible light reflected, by a physical part of the document 70 and the background element 50, back to an image sensor 11 of the scanning module 10, such as a contact image sensor (CIS) or a charge-coupled device (CCD) image sensor. Therefore, the first signal S1 is representative of a composite visible light image IS1 of the document 70 and the background element 50, and is also representative of visible light channel values of original pixels P0. On the other hand, a transmitting light source 40 (e.g., infrared light source) of the scanning module 10 is disposed above the background element 50 and the document 70, the infrared light outputted from the infrared light source may transmit through the background element 50, and transmit through a hole 70H of the document 70 and portions other than the document 70 or outside edges of the document 70. That is, the infrared light cannot transmit through the physical part (may also be defined as a part having a predetermined thickness) of the document 70. Therefore, the second signal S2 is representative of a transmitting light image IS2 transmitting through the document 70, and may also be representative of the transmitting light image IS2 obtained after the transmitting light transmits through the document 70 and the background element 50. That is, the second signal S2 is representative of transmitting light channel values of the original pixels P0. In addition, the background element 50 may serve as a standard-white calibration reference of the image sensor 11.

The processor 20 is electrically connected to the scanning module 10, and generates, according to the first signal S1 and the second signal S2, a final image file FI having first pixels P1 and second pixels P2 arranged in a rectangular array RM. In one example, the final image file FI has information such as headers, footers and the like. The first pixels P1 is representative of a visible light image I1 of the document 70 having an outer contour OP and an inner contour IP, or is representative of the visible light image I1 of the physical part of the document 70. The second pixels P2 is representative of a remaining image I2 other than the document 70, and is also representative of the images of the non-physical part (e.g., the hole or damaged part) of the document 70 and the part other than the document 70. In addition, the transmitting light channel value of the second pixel P2 is greater than 0%. In another point of view, the combination of the first signal S1 and the second signal S2 may be defined as the original pixels P0, the channel values of the original pixels P0 can be obtained using the scanning module 10 to perform scanning, and the following method to be explained can be performed so that the original pixels P0 can be precisely classified into the first pixels P1 and the second pixels P2.

The output port 30 electrically connected to the processor 20 outputs the final image file FI to an external device 200. The output port 30 includes, for example but without limitation to, a wired network connection port, a wireless network connection port, a universal serial bus (USB) connection port and the like.

With the above-mentioned scanner 100, the signal obtained by optical scanning can be utilized to directly and quickly generate and output the image having the visible light channel values and transmittance, and to precisely obtain the boundary and position of the hole of the document 70, and precisely remove the shadow.

In this embodiment, the scanning module 10 performs one-time scanning on the document 70 to generate the first signal S1 and the second signal S2 to achieve the time-saving effect. In another example, the scanning module 10 can perform multiple times of scanning on the document 70 to generate the signal, but the invention is not restricted thereto.

Figure 3:
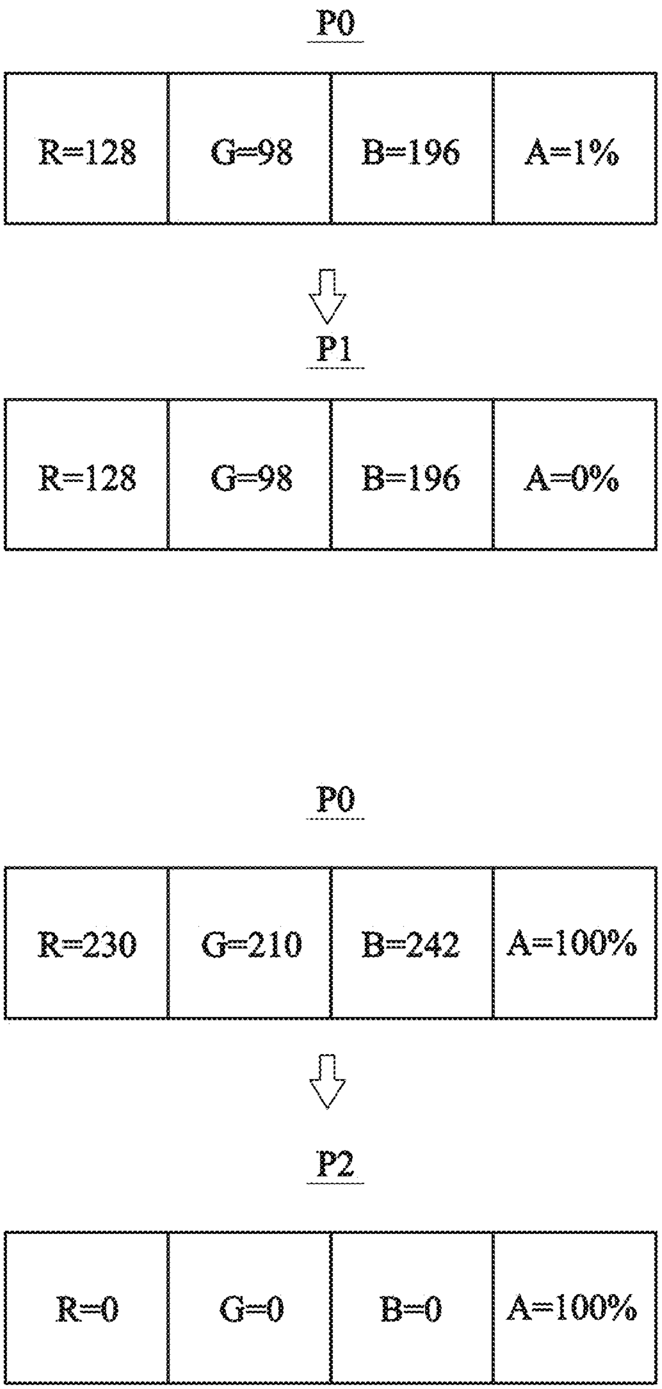
FIG. 3 shows an example of channel values of original pixels classified into a first pixel and a second pixel.

FIG. 3 shows an example of channel values of original pixels P0 classified into the first pixel P1 and the second pixel P2. Referring to FIG. 3, an original pixel P0 has a red channel value (R=128), a green channel value (G=98), a blue channel value (B=196) and a transmitting light channel value (A=1%). After being processed by the processor 20 of FIG. 1, the original pixel P0 is determined as being representative of the physical part of the document according to the transmitting light channel value A=1%), and pertaining to the first pixel P1, so the red, green and blue channel values are kept, and the transmitting light channel value (A=1%) is set to (A=0%). That is, the transmitting light channel value of the first pixel P1 is equal to 0%, so that the first pixel P1 has the channel values in FIG. 3. Of course, the transmitting light channel value (A=1%) may also be kept in another example.

Another original pixel P0 has the red channel value (R=230), the green channel value (G=210), the blue channel value (B=242) and the transmitting light channel value (A=100%). After being processed by the processor 20 of FIG. 1, the original pixel P0 is determined as being representative of the non-physical part of the document or the part other than the document according to the transmitting light channel value (A=100%), and pertaining to the second pixel P2, so the red, green and blue channel values are set to 0 (i.e., the second pixel P2 has the visible light intensity value of 0), and the transmitting light channel value (A=100%) is kept as (A=100%), so that the second pixel P2 has the channel values of FIG. 3. In another example, the original red, green and blue channel values may also be kept, so that the user can retrieve the visible light channel values of the original from the external device for other applications. For example, a comparison report chart may be produced to prove the effect that can be provided by the scanner of this embodiment. It is understandable that the red, green and blue channel values may correspond to the visible light channel values in the application of the black-and-white scanning module. Therefore, the first signal S1 and the second signal S2 are representative of the visible light channel values and the transmitting light channel values of the original pixels P0. In another example, R, G, B may also be converted into the luminance Y, the red-difference chroma Cr and the blue-difference chroma Cb.

Figure 4:
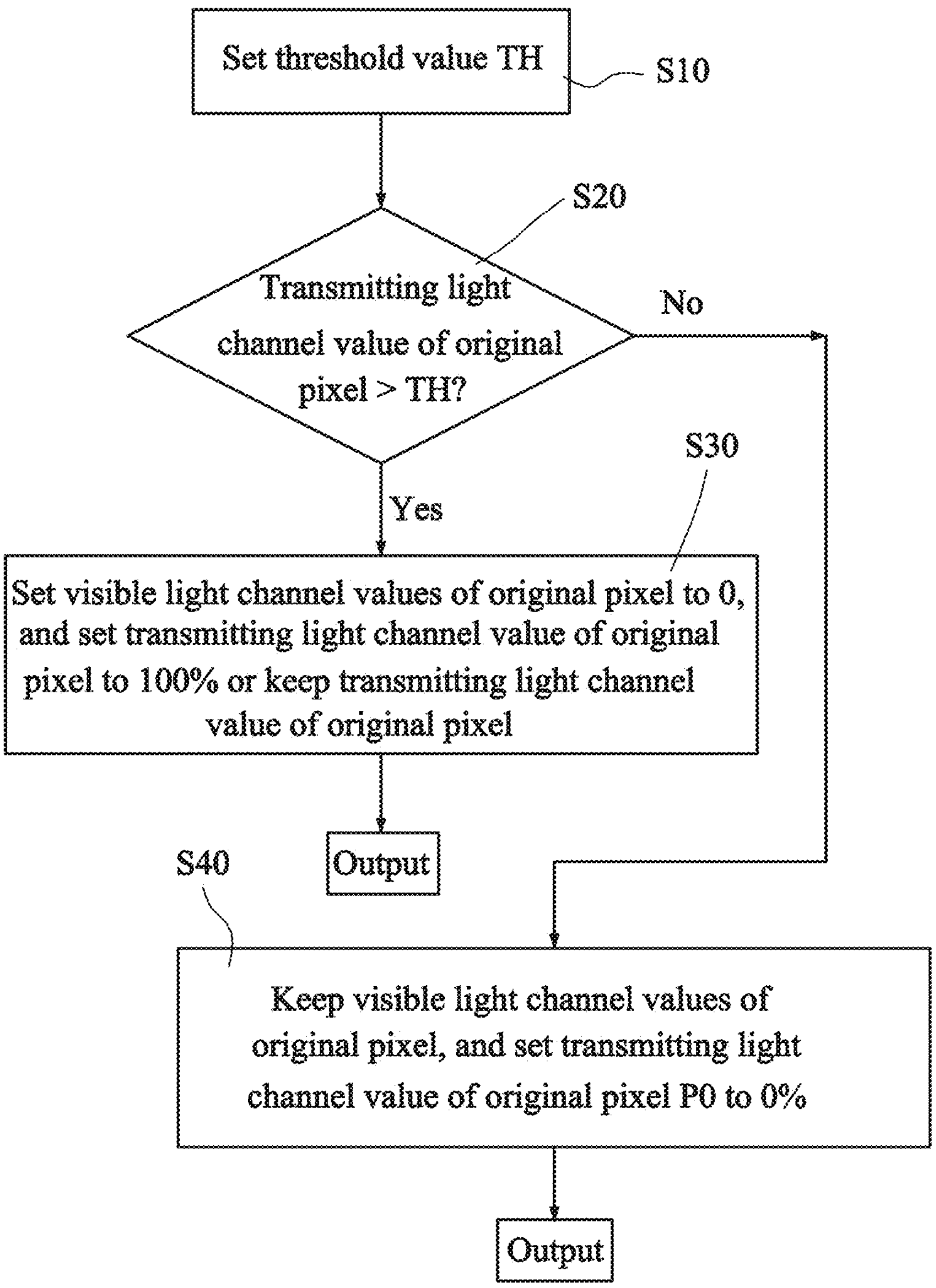
FIG. 4 is a flow chart showing steps performed by a processor of FIG. 1.

FIG. 4 is a flow chart showing steps performed by the processor of FIG. 1. Referring to FIG. 4, the processor 20 performs steps S10, S20, S30 and S40. In the step S10, a threshold value TH is set by receiving a user's input or selecting one of values from a database according to different states, or is set as a default value. In the step S20, it is judged whether the transmitting light channel value (e.g., fourth channel value) of each original pixel P0 is greater than the threshold value TH or not. If yes, the step S30 is entered, the visible light channel values (e.g., first, second and third channel values) of the original pixel P0 are set to 0 serving as the visible light channel values of the second pixel P2, and the transmitting light channel value of the original pixel P0 is set to 100% serving as the transmitting light channel value of the second pixel P2. Next, the channel values of the first pixel P1 and the second pixel P2 can be outputted. If not, then the step S40 is entered to keep the visible light channel values of the original pixel P0 serving as the visible light channel values of the first pixel P1, and to set the transmitting light channel value of the original pixel P0 to 0% serving as the transmitting light channel value of the first pixel P1. The first pixels P1 and the second pixels P2 may constitute a final image file. Next, the channel values of the first pixel P1 and the second pixel P2 may be outputted. It is understandable that it is unnecessary to set the transmitting light channel value as 100% because the original transmitting light channel value may also be kept so that the external device 200 can have further applications. For example, the external device 200 may judge the crease of the document (the thickness is small, and the transmittance thereof differs from that of each of other parts) or the posted part of the document according to the transmitting light channel value. Of course, the processor 20 may also judge the crease of the document or the posted part of the document. In addition, it is unnecessary to set the visible light channel value(s) of the original pixel P0 to 0 because the original visible light channel values may be kept.

The above-mentioned processing and judging methods are very simple, do not need the high-end processor and the large-capacity memory, and the cost is further decreased.

Figure 5:
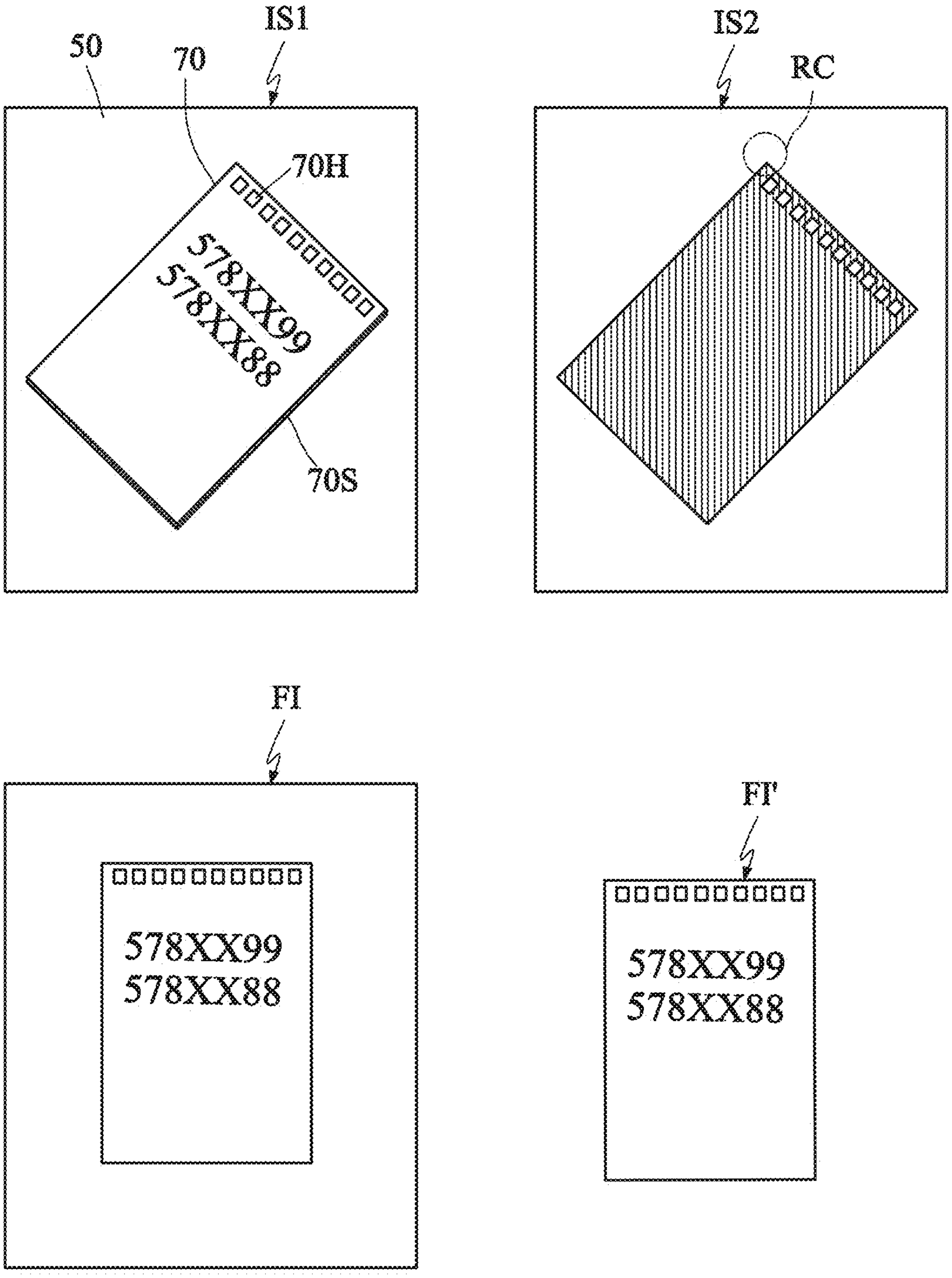
FIG. 5 is a schematic view showing an example of obtaining two final image files according to a composite visible light image and a transmitting light image.

FIG. 5 is a schematic view showing an example of obtaining two final image files according to the composite visible light image and the transmitting light image. Referring to FIGS. 5 and 1, the processor 20 may further process the composite visible light image IS1 into the visible light image I1 according to one or multiple right-angle contour portions RC of the transmitting light image IS2 represented by the second signal S2, and then perform skew corrections on the visible light image I1 to generate the final image file FI. The visible light image I1 includes the image representative of the hole 70H of the document 70 and the image of the shadow 70S of the document 70. In this case, the first signal S1 is representative of the composite visible light image IS1 of the document 70, the background element 50 and the shadow 70S and the hole 70H of the document 70. The right-angle contour portion RC may be obtained by looking for the outer boundary corresponding to the document 70, wherein the determination can be made according to the arrangement direction of the pixels representative of the outer boundary. The outer boundary can be easily and precisely obtained according to the transmitting light image IS2. With the above-mentioned embodiment, the shadow of the document can be precisely removed.

In another example, the processor 20 may further perform automatic cropping on the visible light image I1 according to one or multiple right-angle contour portions RC of the transmitting light image IS2 represented by the second signal S2 to obtain a final image file FI'. In still another example, the processor 20 may further process the first signal S1 and the second signal S2 into a composite visible light image file (representative of composite visible light image) and a transmitting light image file (representative of transmitting light image), respectively, and the output port 30 may further output the composite visible light image file and the transmitting light image file to the external device 200. Therefore, the final image file, the composite visible light image file and the transmitting light image file may be outputted and further processed by the external device 200, and the external device 200 may further process the composite visible light image file and the transmitting light image file into another final image file, and judge whether the another final image file matches with the final image file or not. If not, the firmware of the scanner 100 needs to be calibrated or corrected.

With the scanner of the embodiment, the image file including transparency and visible light information can be obtained and generated, the generated file format may be the portable network graphics (PNG) format, the portable document format (PDF) format supporting the layering function or any other file format. After the external device has received the file, the non-physical part corresponding to the document and the part other than the document may change to the color of the background with the change of the color of the background. Therefore, the original contour, hole, damage and the like of the document can be present. On the other hand, the shadow of the document may also be further removed, so that the original contour of the document can be present without distortion.

The specific embodiments proposed in the detailed description of this disclosure are only used to facilitate the description of the technical contents of this disclosure, and do not narrowly limit this disclosure to the above-mentioned embodiments. Various changes of implementations made without departing from the spirit of this disclosure and the scope of the claims are deemed as falling within the following claims.

The invention claimed is:

1. A scanner, comprising:

a scanning module scanning a document and a background element to generate a first signal and a second signal, wherein the first signal is representative of a composite visible light image of the document and the background element, and the second signal is representative of a transmitting light image transmitting through the document;

a processor, which is electrically connected to the scanning module, and generates a final image file having first pixels and second pixels according to the first signal and the second signal, wherein the first pixels and the second pixels are arranged in a rectangular array, the first pixels are representative of a visible light image of the document, the second pixels are representative of a remaining image other than the document, and the second pixels have transmitting light channel values greater than 0%; and an output port, which is electrically connected to the processor, and outputs the final image file to an external device, wherein the first signal and the second signal are respectively representative of visible light channel values and transmitting light channel values of original pixels, and the processor judges whether the transmitting light channel value of each of the original pixels is greater than a threshold value or not; wherein if yes, the processor keeps the visible light channel value of the original pixel or sets the visible light channel value of the original pixel to 0, or the processor sets the transmitting light channel value of the original pixel to 100%; and if not, the processor keeps the visible light channel value of the original pixel, and sets the transmitting light channel value of the original pixel to 0%.

2. The scanner according to claim 1, wherein the scanning module performs one-time scanning on the document to generate the first signal and the second signal.

3. The scanner according to claim 1, wherein the first pixels have transmitting light channel values equal to 0%.

4. The scanner according to claim 1, wherein the second pixels have visible light intensity values equal to 0.

5. The scanner according to claim 1, wherein the processor further performs skew corrections on the visible light image according to one or multiple right-angle contour portions of the transmitting light image represented by the second signal.

6. The scanner according to claim 1, wherein the processor further performs automatic cropping on the visible light image according to one or multiple right-angle contour portions of the transmitting light image represented by the second signal.

7. The scanner according to claim 1, wherein the first signal is representative of the composite visible light image of the document, the background element and a shadow of the document.

8. The scanner according to claim 1, wherein the transmitting light channel values of the second pixels are equal to 100%.

9. The scanner according to claim 1, wherein the processor further processes the first signal and the second signal into a composite visible light image file and a transmitting light image file, respectively, and the output port further outputs the composite visible light image file and the transmitting light image file to the external device.

* * * * *